(12) United States Patent
Jakimov et al.

(10) Patent No.: US 10,285,222 B2
(45) Date of Patent: May 7, 2019

(54) METHOD AND DEVICE FOR GENERATIVELY PRODUCING AT LEAST ONE COMPONENT AREA

(75) Inventors: Andreas Jakimov, Munich (DE); Herbert Hanrieder, Hohenkammer (DE); Wilhelm Meiners, Aachen (DE)

(73) Assignee: MTU AERO ENGINES AG, Munich (DE)

( * ) Notice: Subject to any disclaimer, the term of this patent is extended or adjusted under 35 U.S.C. 154(b) by 1169 days.

(21) Appl. No.: 13/821,371

(22) PCT Filed: Sep. 8, 2011

(86) PCT No.: PCT/DE2011/075215
§ 371 (c)(1),
(2), (4) Date: May 15, 2013

(87) PCT Pub. No.: WO2012/048696
PCT Pub. Date: Apr. 19, 2012

(65) Prior Publication Data
US 2013/0233846 A1    Sep. 12, 2013

(30) Foreign Application Priority Data

Sep. 8, 2010  (DE) .................. 10 2010 044 780
Nov. 4, 2010  (DE) .................. 10 2010 050 531

(51) Int. Cl.
*H05B 6/10*      (2006.01)
*B22F 3/105*     (2006.01)
(Continued)

(52) U.S. Cl.
CPC .......... *H05B 6/101* (2013.01); *B22F 3/1055* (2013.01); *B23K 15/0093* (2013.01);
(Continued)

(58) Field of Classification Search
CPC .... H05B 6/101; B23K 15/0093; B23K 26/34; B23K 35/0244; B22F 3/1055; B22F 7/02
See application file for complete search history.

(56) References Cited

U.S. PATENT DOCUMENTS

| 4,944,817 A | 7/1990 | Bourell et al. |
| 5,393,482 A | 2/1995 | Benda et al. |

(Continued)

FOREIGN PATENT DOCUMENTS

| DE | 19649865 C1 | 2/1998 |
| DE | 19953000 A1 | 5/2001 |

(Continued)

OTHER PUBLICATIONS

Benda J A: "Temperature-controlled selective laser sintering", Proceedings of Solid Freeform Fabrication Symposium, Jan. 1, 1994, pp. 277-284.

(Continued)

*Primary Examiner* — Brian W Jennison
(74) *Attorney, Agent, or Firm* — Abel Schillinger, LLP

(57) ABSTRACT

Disclosed is a method for generatively producing or for repairing at least one area of a component, wherein a zone arranged downstream of a molten bath is post-heated to a post-heating temperature and the component is set to a base temperature, and also a device for carrying out such a method.

20 Claims, 1 Drawing Sheet

(51) Int. Cl.
*C22C 19/05* (2006.01)
*B23K 15/00* (2006.01)
*B23K 26/34* (2014.01)
*B23K 35/02* (2006.01)
*B33Y 10/00* (2015.01)
*B33Y 30/00* (2015.01)

(52) U.S. Cl.
CPC .......... *B23K 26/34* (2013.01); *B23K 35/0244* (2013.01); *C22C 19/057* (2013.01); *B22F 2003/1056* (2013.01); *B22F 2203/11* (2013.01); *B33Y 10/00* (2014.12); *B33Y 30/00* (2014.12); *Y02P 10/295* (2015.11)

(56) References Cited

U.S. PATENT DOCUMENTS

| | | | |
|---|---|---|---|
| 5,508,489 A * | 4/1996 | Benda | B22F 3/1055 219/121.76 |
| 5,760,366 A * | 6/1998 | Haruta | C23C 14/022 219/121.68 |
| 6,007,764 A | 12/1999 | Benda et al. | |
| 6,215,093 B1 | 4/2001 | Meiners et al. | |
| 2004/0056022 A1 * | 3/2004 | Meiners | B22F 3/1055 219/634 |
| 2005/0194363 A1 * | 9/2005 | Hu | B23K 26/032 219/121.64 |
| 2010/0151145 A1 | 6/2010 | Richter et al. | |
| 2012/0237745 A1 | 9/2012 | Dierkes et al. | |

FOREIGN PATENT DOCUMENTS

| | | |
|---|---|---|
| DE | 10104732 C2 | 6/2002 |
| DE | 102007059865 A1 | 6/2009 |
| WO | 2008071165 A1 | 6/2008 |
| WO | 2011018463 A1 | 2/2011 |

OTHER PUBLICATIONS

M. Geiger et al. "Advanced Rapid Prototyping by laser beam sintering of metal prototypes—design and development of an optimised laser beam delivery system", SPIE, 1996, pp. 103-114.

Kruth et al.: "Progress in Additive Manufacturing and Rapid Prototyping", CIRP Annals, Elsevier BV, NL, CH, FR, vol. 47, No. 2, Jan. 1, 1998, pp. 525-540.

* cited by examiner

METHOD AND DEVICE FOR GENERATIVELY PRODUCING AT LEAST ONE COMPONENT AREA

BACKGROUND OF THE INVENTION

1. Field of the Invention

The invention relates to a method for generatively producing at least one area of a component and to an apparatus for carrying out such a method.

2. Discussion of Background Information

A method and an apparatus for generatively producing a component are disclosed, for example, in German patent DE 196 49 865 C1. The component is made up of individual powder layers which are each fixed to the preceding powder layer by means of a laser beam guided in accordance with a cross-sectional geometry of a component model. In the case of alloys which are not suitable for fusion welding, such as Mar M247, however, the high local temperature gradient between the molten bath and adjoining component areas can lead to hot cracking.

DE 10 2007 059 865 A1 proposes, for example for setting stress profiles, post-treating the powder layer by means of the introduction of heat after the melting or after the solidification of the melt. Material characteristics such as hardness, toughness or strength and also the material behavior can thereby be locally influenced in a targeted manner.

Patent application WO 2008/071165 A1, in the name of the applicant, proposes reducing the hot cracking by global heating of the component in the area of the powder layer to be produced. This effect can only be achieved, however, in the case of a relatively low feed rate.

It is also known for the component to be preheated by means of induction in the powder bed. This has the disadvantage that it may lead to an inhomogeneous temperature distribution in the case of complex component geometries, even despite adaptation of the induction coil geometry. This has negative effects on the component quality.

It is an object of the invention to provide a method for generatively producing at least one area of a component which eliminates the aforementioned disadvantages and prevents or at least greatly reduces hot cracking particularly in the case of a high feed rate, and also an apparatus for carrying out such a method.

This object is achieved by the method and by the apparatus according to the present invention as set forth below.

SUMMARY OF THE INVENTION

In a method according to the invention for generatively producing at least one area of a component which is made up of individual powder layers, the powder layer to be produced is heated locally to a melting temperature by means of a first high-energy beam and a molten bath is formed. According to the invention, a zone arranged downstream of the molten bath is post-heated to a post-heating temperature by means of a second high-energy beam, and the component is set globally to a base temperature by means of a heating device. The solution according to the invention adapts the temperature downstream of the molten bath to the melting temperature, such that only a small temperature gradient is present in the component area of the molten bath and therefore hot cracking is prevented. Since the melting temperature is very high, however (in the case of Mar M247, it is 1300° C. to 1400° C., for example), the component which forms is additionally preheated to a base temperature or to a base temperature level according to the invention. The powder deposited on the component is thereby preheated to a temperature close to the melting temperature, as a result of which the heating of the powder to the melting temperature can be temporally shortened and therefore the feed rate can be increased.

In one exemplary embodiment, the base temperature is set at a constant temperature level, preferably in a range of between 300° C. and 400° C. below the melting temperature. Given a melting temperature of between 1300° C. and 1400° C., the base temperature is therefore preferably approximately 900° C. to 1100° C.

To uniformly set the temperature of the component, it is advantageous if energy is introduced into the component from as many sides as possible and the latter is therefore heated over its entire surface area or virtually over its entire surface area.

In a preferred exemplary embodiment, the component is heated inductively, which makes particularly quick and targeted heating possible.

In one exemplary embodiment, the downstream zone is formed adjoining the molten bath. Steep changes in temperature between the molten bath and the post-heating zone and therefore unnecessary loading of the powder layer to be produced are thereby avoided.

In order to prevent an environment of the heating device from being heated, the latter can be cooled by way of a cooling device delimiting its environment, for example.

An apparatus according to the invention for carrying out a method as claimed in one of the preceding claims has a first radiation source for emitting a high-energy beam, for example a laser beam or an electron beam, which can be moved in relation to the area of a component to be produced generatively, for locally heating a powder layer to be produced to a melting temperature for producing a molten bath. According to the invention, provision is made of a second radiation source for emitting a second high-energy beam, for example a laser beam, an electron beam or an IR beam, which can be moved in relation to the component area, for post-heating a zone arranged downstream of the molten bath to a post-heating temperature, and of a heating device for setting the component globally to a base temperature.

In a preferred exemplary embodiment, the heating device is in the form of an induction coil which delimits a heating chamber for receiving the component. An alternating current flows through the induction coil, as a result of which a magnetic field forms, this bringing about eddy currents in the component which are converted into Joule heat.

It is preferable for a cooling device to be provided for cooling an environment surrounding the heating device.

In order to obtain the greatest possible flexibility with respect to the feed direction, the radiation sources can be operated as the other respective radiation source.

Other advantageous exemplary embodiments of the invention are the subject of further dependent claims.

BRIEF DESCRIPTION OF THE DRAWINGS

Preferred exemplary embodiments of the invention will be explained in more detail hereinbelow with reference to greatly simplified schematic illustrations, in which.

DETAILED DESCRIPTION OF THE INVENTION

Figure 1:
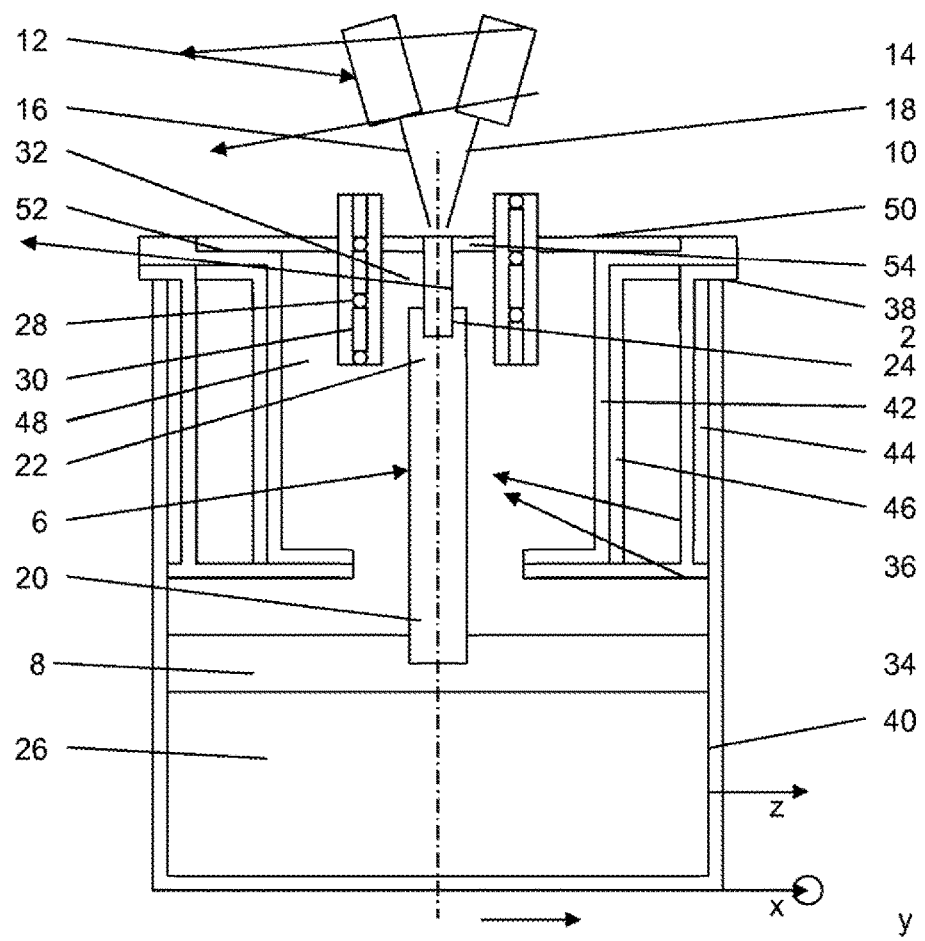
FIG. 1 shows a cross-sectional view of an apparatus according to the invention.

As shown in the simplified illustration in FIG. 1, an apparatus 1 according to the invention for generatively producing, in particular for repairing or reconstructing, an area of a component 2, for example a rotor blade of an aircraft engine, by forming a multiplicity of powder layers 4a, 4b, 4c arranged one above another (see FIG. 2) has a mounting 6 for receiving the component 2, a lifting table 8 for lowering the component 2 in the vertical direction z, a heating device 10 for setting the component 2 to a base temperature T1, and two radiation sources 12, 14 for emitting in each case a high-energy beam 16, 18 in the direction of the component 2 for fixing and solidifying and for locally post-heating the powder layer 4a, 4b, 4c produced last in each case.

The mounting 6 is in the form of a pillar, which is supported with a foot portion 20 on the lifting table 8 and, with a head portion 22, defines a receptacle 24 for fixing the component 2 during processing.

The lifting table 8 is mounted in an installation space 26 of the apparatus 1 so as to be movable in the vertical direction z and, after each powder layer application, is lowered by a layer thickness of the subsequent powder layer 4a, 4b, 4c.

The heating device 10 is in the form of a liquid-cooled induction coil. It has a coil 28, through which current can flow and between the coil threads of which there is arranged a coolant duct 30. It defines a radially closed heating chamber 32, in which the component 2 is arranged and which has such a height that the component 2 is positioned in the heating chamber 32 throughout the processing process. The component 2 is heated to the base temperature T1 and kept at this temperature constantly by means of the heating device 10. The base temperature T1 or the set temperature level is dependent on material and is, for example in the case of the alloy Mar M247, approximately 900° C. to 1100° C. The base temperature T1 is preferably approximately 300° C. to 400° C. below a preferred melting temperature T2 of the respective alloy or of the powder.

Figure 2:
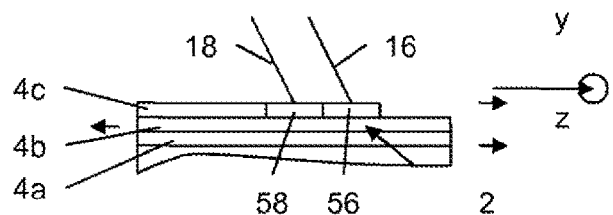
FIG. 2 shows a plan view of a component area to be produced.
Figure 3:
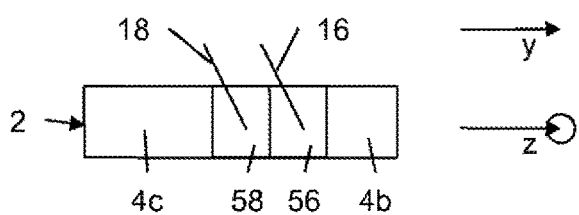
FIG. 3 shows a cross section through the component area shown in FIG. 2.

The radiation sources 12, 14 are preferably lasers emitting laser beams 16, 18, in particular solid-state lasers such as Nd:YAG with a wavelength of $\lambda=1064$ nm, the beam guidance of which is explained in more detail in FIGS. 2 and 3.

Furthermore, the apparatus 1 has a housing 34 inserted into the installation space 26 and a cooling device 36. The housing 34 is arranged above the lifting table 8 and is supported on the edge 38 of a side wall 40 of the apparatus 1 which delimits the installation space 26. It is split into two with an inner wall 42 and an outer wall 44, which delimit an annular space 46 for receiving the cooling device 36. The cooling device 36 serves in particular for avoiding a lateral environment 48 surrounding the heating device 10.

Furthermore, the apparatus 1 has an outer cover 50 for closing off the installation space 26 at the end outside the heating device 10, which cover is inserted in a recess 52 in the inner wall 42 and extends radially in relation to the heating device 10. Similarly, provision is made of an inner end cover 54, which closes off the heating chamber 32 in the axial direction and defines a working plane for building up the powder layers 4a, 4b, 4c.

For feeding the powder to form the powder layers 4a, 4b, 4c in the area of the component 2 in the working plane, the apparatus 1 has a supply device (not shown). In addition, the apparatus 1 has a slide (not shown) guided over the inner cover 50 for forming the powder layers 4a, 4b, 4c and also for setting the layer thicknesses thereof. The powder is preferably selected from a group consisting of high-temperature-resistant alloys which are not suitable for fusion welding, for example Mar M247, and has a preferred particle size with a diameter d<63 µm. In addition, it can be gas-atomized with a high fines content.

As shown in FIGS. 2 and 3, which show a method step 3 according to the invention for producing the component area, the powder layers 4a, 4b, 4c, as indicated by the arrows, are produced by an alternating relative linear movement or feed direction in the x direction between the laser beams 16, 18 and the component 2. To realize this alternating or direction-changing movement, the lasers 12, 14 can be operated as the other respective laser 14, 12. The laser beams 14, 16 in this respect preferably each have such a focusing that the diameter thereof corresponds to the width of the component area to be produced.

The laser beams 16, 18 are each directed at a local zone 56, 58 of the component 2 which are arranged in succession in the feed direction. The zones 56, 58 can be of the same size and are arranged adjoining one another. As viewed in the feed direction, the powder is heated to the melting temperature T2 in the front or first zone 56 by means of the first laser beam 16. The rear or second zone 58 is heated to a post-heating temperature T3 by means of the second laser beam 18. The melting temperature T2 is dependent on material and/or is, in the case of the high-temperature-resistant alloy such as Mar M247, approximately 1300° C. to 1400° C. The post-heating temperature T3 is likewise dependent on material and/or dependent on location (for compensating for an inhomogeneous temperature distribution in complex component geometries), but is greater than the base temperature T1, such that the following relationship applies: T2>T3>T1. To build up the component area, the latter is set to the base temperature T1 in its powder bed by way of the heating device 10. The applied powder layer 4c is likewise heated to the base temperature T1 as it is being deposited. Then, the lasers 12, 14 are actuated and guided over the powder layer 4c in succession in the feed direction. The powder in the front zone 56 is heated to the melting temperature T2 by way of the front laser beam 16, melted and fixed to the previously produced powder layer 4b. The powder which has just been fixed then passes through the post-heating zone 58, in which it is set by way of the rear laser beam 18 to the post-heating temperature T3, which is lower than the melting temperature T2 but higher than the base temperature T1. After it has left the post-heating zone, the powder cools to the base temperature T1, which corresponds to the general component temperature during processing. The temperature profile or the temperature gradient between the molten bath 56 and the following component zone is therefore harmonized, or the temperature gradient proceeding from the molten bath 56 via the post-heating zone 58 to the following component area is balanced. Furthermore, the preheating of the component 2 to the base temperature T1 brings about a relatively small necessary rise in temperature of the powder supplied to the component 2 for heating to the melting temperature T2.

Disclosed is a method for generatively producing or for repairing at least one area of a component, in which a zone arranged downstream of a molten bath is post-heated to a post-heating temperature and the component is set to a base temperature, and also an apparatus for carrying out such a method.

LIST OF REFERENCE SIGNS

1 Apparatus
2 Component
4a, b, c Powder layer
6 Mounting
8 Lifting table
10 Heating device
12 Radiation source
14 Radiation source
16 High-energy beam
18 High-energy beam
20 Foot portion
22 Head portion
24 Receptacle
26 Installation space
28a, b, c Coil thread
30 Coolant duct
32 Heating chamber
34 Housing
36 Cooling device
38 Edge
40 Side wall
42 Inner wall
44 Outer wall
46 Inner space
48 Environment
50 Outer cover
52 Recess
54 Inner cover
56 Molten bath
58 Post-heating zone
T1 Base temperature
T2 Melting temperature
T3 Post-heating temperature

What is claimed is:

1. A method for generatively producing or for repairing at least one area of a component which is made up of individual powder layers, wherein the method comprises
   (i) locally heating, by a first high-energy beam, a powder layer to a melting temperature (T2), whereby a molten bath is formed locally at a part of the component corresponding to the first high-energy beam, the first high-energy beam being moved across the component so that the molten bath is formed in consecutive parts of the component,
   (ii) post-heating to a post-heating temperature (T3), by second high-energy beam which follows a movement of the first high-energy beam, a part arranged downstream of a current molten bath, which part has already been heated by the first high-energy beam, and
   (iii) setting, by an additional heating device, a temperature of the component in its entirety to a base temperature (T1),
   wherein T2>T3>T1 and wherein the part arranged downstream of a current molten bath adjoins the molten bath so that steep changes in temperature between the current molten bath and a post-heated part are avoided.

2. The method of claim 1, wherein the base temperature (T1) is kept at a constant level.

3. The method of claim 2, wherein the base temperature (T1) is kept in a range of between 300° C. and 400° C. below the melting temperature (T2).

4. The method of claim 1, wherein the component is heated virtually uniformly over its entire surface area.

5. The method of claim 4, wherein the component is heated inductively.

6. The method of claim 1, wherein an environment surrounding the additional heating device is cooled.

7. The method of claim 1, wherein the first high-energy beam is a laser beam.

8. The method of claim 1, wherein the first high-energy beam is an electron beam.

9. The method of claim 1, wherein the second high-energy beam is a laser beam.

10. The method of claim 1, wherein the second high-energy beam is an electron beam.

11. The method of claim 1, wherein the second high-energy beam is an IR beam.

12. An apparatus for carrying out the method of claim 1, wherein the apparatus comprises (a) a first radiation source for emitting the first high-energy beam, which is movable in relation to an area of the component to be produced generatively or to be repaired, to locally heat the powder layer to be produced to a melting temperature (T2) for producing the molten bath, (b) a second radiation source for emitting the second high-energy beam, which is movable in relation to the component, for post-heating the zone arranged downstream of the molten bath to a post-heating temperature (T3), and (c) an additional heating device for setting the component to a base temperature (T1), the first and second radiation sources and the additional heating device being designed such that T2>T3>T1, and wherein the additional heating device is an induction coil which radially delimits a heating chamber for receiving the component such that the component is positioned in the heating chamber throughout its production or repair.

13. The apparatus of claim 12, wherein the apparatus further comprises a cooling device for cooling an environment surrounding the additional heating device (c).

14. The apparatus of claim 12, wherein the first radiation source (a) can be operated as the second radiation source (b) and vice versa.

15. The apparatus of claim 12, wherein the first high-energy beam is a laser beam.

16. The apparatus of claim 12, wherein the first high-energy beam is an electron beam.

17. The apparatus of claim 12, wherein the second high-energy beam is a laser beam.

18. The apparatus of claim 12, wherein the second high-energy beam is an electron beam.

19. The apparatus of claim 12, wherein the base temperature (T1) is from about 900° C. to 1100° C.

20. The method of claim 1, wherein the base temperature (T1) is from about 900° C. to 1100° C.

* * * * *